May 9, 1961 K. HÄUSSERMANN 2,983,503
CONE-SHAPED SPRING OF THE BELLEVILLE SPRING TYPE
Filed April 24, 1959
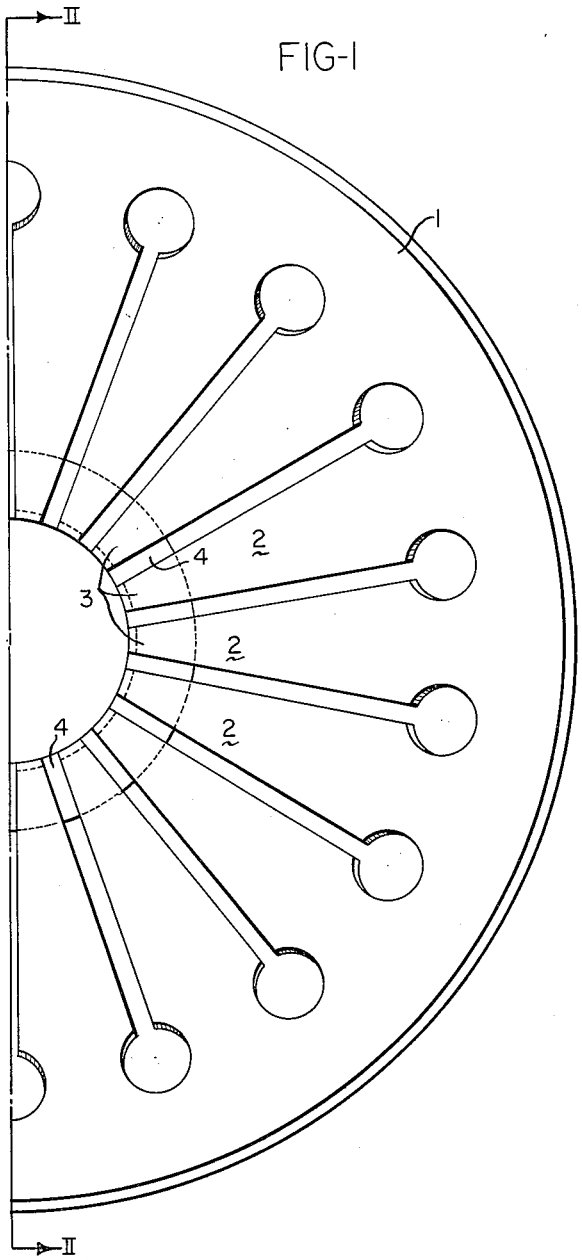
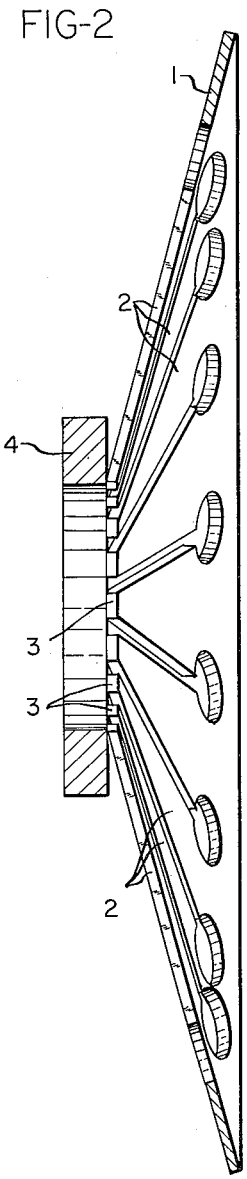
INVENTOR.
Kurt Häussermann
BY
Patent Agent

2,983,503
Patented May 9, 1961

2,983,503

CONE-SHAPED SPRING OF THE BELLEVILLE SPRING TYPE

Kurt Häussermann, Stuttgart, Germany, assignor to Lamellen- und Kupplungsbau August Häussermann, Stuttgart-Oberturkheim, Germany Filed Apr. 24, 1959, Ser. No. 808,650

Claims priority, application Germany Apr. 24, 1958

1 Claim. (Cl. 267—1)

The present invention relates to a cone-shaped spring of the Belleville spring type, especially for clutches of motor vehicles, said spring being provided with inwardly extending tongues. These tongues generally are operatively connected to a throw-out disc or throw-out collar which is operable by means of a throw-out lever or pressure member. Such throw-out disc or throw-out collar may be rotatably journalled on ball bearings but may also be non-rotatably mounted so as to form a sliding member for instance of steel.

Heretofore a Belleville type spring with the above mentioned tongues has been uniformly hardened as an entirety. Due to the fact that the individual tongues are in engagement with or rest upon the pressure member or the throw-out disc or throw-out collar, the respective portions of the individual tongues are subjected to a considerable wear. Heretofore this drawback has been put up with and the wear at the ends of the tongues of the conical or disc-shaped spring was considered unavoidable.

It is, therefore, an object of the present invention to create a Belleville type spring especially for clutches of motor vehicles, which will overcome the above mentioned drawback.

It is also an object of the invention to process the Belleville type spring of the above mentioned kind in such a way that the above mentioned wear at the ends of the tongues of the cone-shaped spring will be considerably reduced.

These and other objects and advantages of the invention will appear more clearly from the following specification in connection with the accompanying drawing, in which:

Fig. 1 illustrates a view of a cone-shaped spring of the Belleville type for use in connection with a clutch.

Fig. 2 is a section along the line II—II of Fig. 1.

The cone-shaped spring 1 shown in the drawing is in a manner known per se provided with tongues 2 the ends of which engage a throw-out disc 4. The said throw-out disc is operatively connected to an axially movable throw-out lever of the clutch, said lever not being shown in the drawing.

When the throw-out lever is moved into its effective position, the throw-out disc against which the ends of the tongues of spring 1 rest will exert a pressure in axial direction of the clutch. Since, as shown in Fig. 2, the ends 3 of tongues 2 continuously slidably rest against the throw-out disc or throw-out ring 4 or another pressure element, it will be evident that the said ends 3 are subjected to a considerable stress. However, the considerable wear normally inherent to such highly stressed parts will be avoided by the present invention according to which the ends 3 have been hardened to make the same especially wear-resistant.

More specifically, according to the present invention, the disc spring 1 is subjected to a kind of stepped hardening, in other words the inner ends 3 of the tongues 2 are hardened to a higher extent than the remaining part of the tongues and the solid annular zone of the disc spring. Expressed differently, this means that the ends 3 of the tongues 2 are harder than the remaining part of the disc spring. Surprisingly, it has been found that a disc spring of a stepped hardening degree set forth above does not show even over a relatively long time of operation the above mentioned and well-known wear appearance at the inner ends of the disc spring. Therefore, with a disc spring according to the invention the life of the disc spring and thereby of the clutch will be considerably increased.

The increased hardening of the inner tongue ends of disc springs is of advantage not only with clutches equipped with throw-out discs but also with clutches in which the tongues directly engage radial openings in the pressure member, said openings being alternately offset laterally with regard to each other so that the pressure member preferably made of drawn sheet metal will be held by the tongues. Inasmuch as also with such constructions the ends of the tongues are subjected to a particularly high stress, the wear of the tongue ends will be considerably reduced in view of the higher degree of hardening at said tongue ends.

It is, of course, to be understood that the present invention is, by no means, limited to the particular clutch shown in the drawing and its manufacture as described above, but also comprises any modifications within the scope of the appended claims.

What I claim is:

A disc spring of the Belleville type, especially for clutches of motor vehicles, which comprises inwardly extending hardened tongues, the inner tongue ends being considerably harder than the remainder of said tongues.

References Cited in the file of this patent

UNITED STATES PATENTS

| | | |
|---|---|---|
| 863,664 | Senderling | Aug. 20, 1907 |
| 2,169,787 | Becker | Aug. 15, 1939 |
| 2,445,638 | Saks | July 20, 1948 |
| 2,604,316 | O'Brien et al. | July 22, 1952 |